Patented July 22, 1947

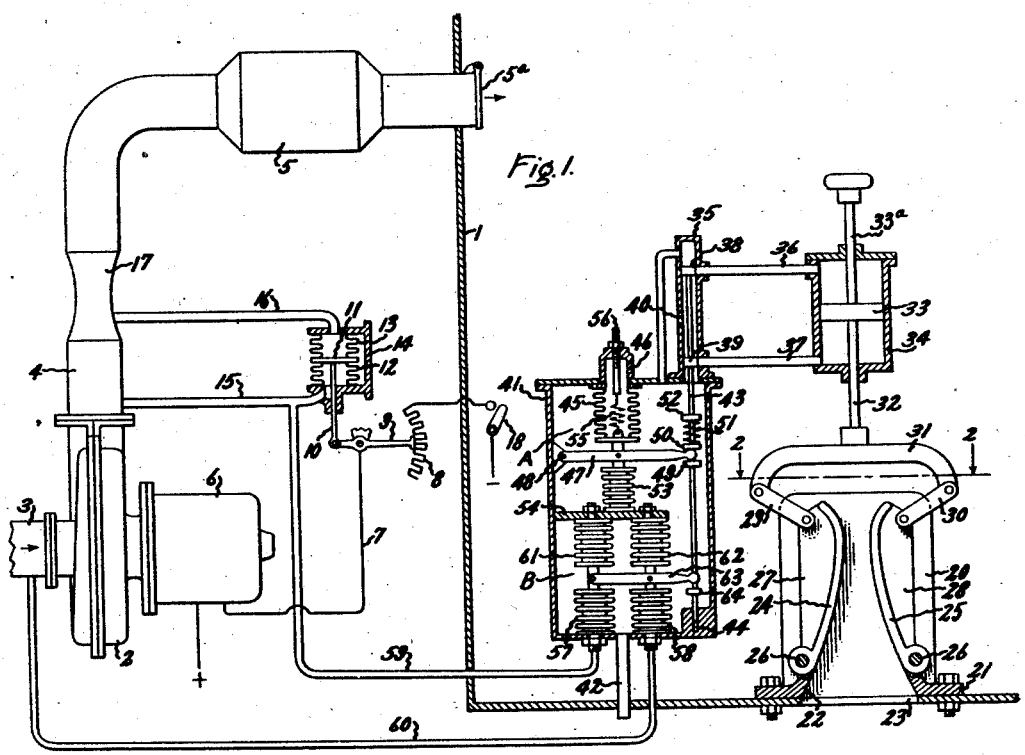

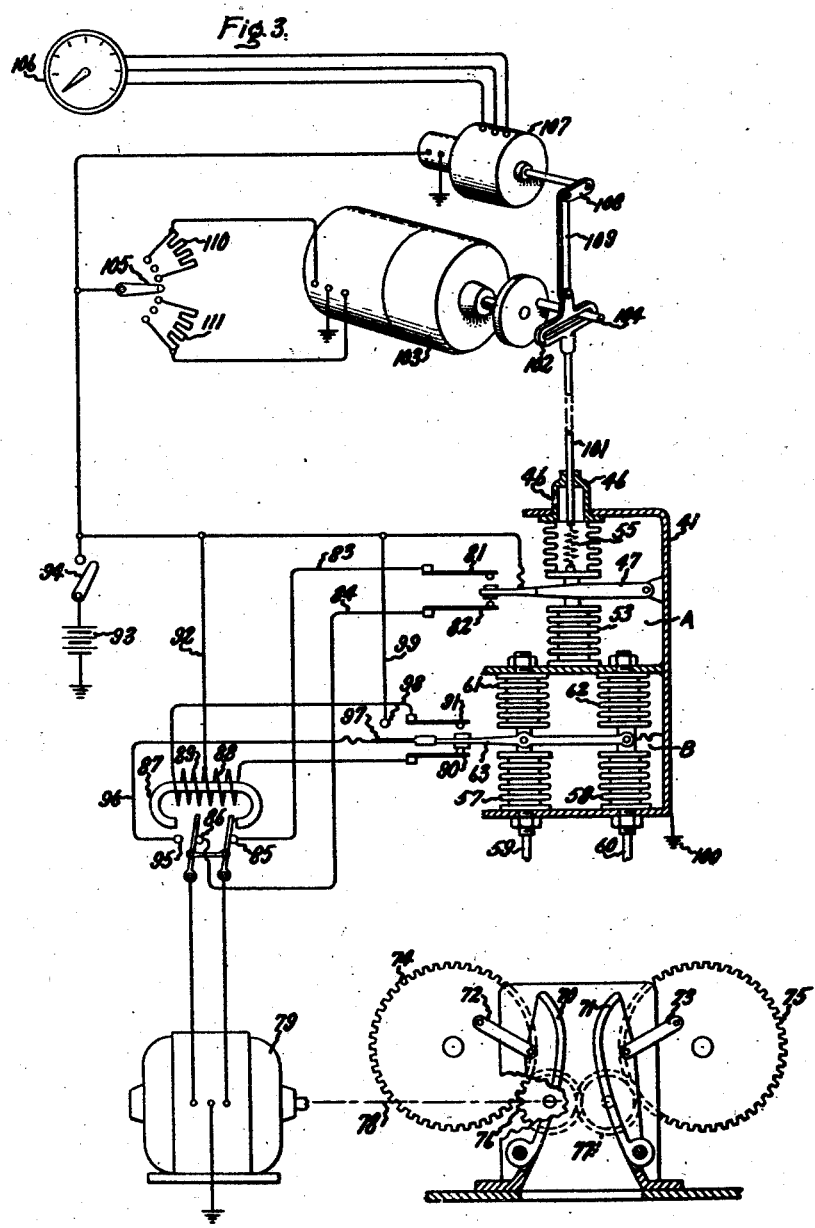

2,424,491

UNITED STATES PATENT OFFICE 2,424,491

AIRCRAFT CABIN SUPERCHARGER ARRANGEMENT

Charles W. Morris, Marblehead, Mass., assignor to General Electric Company, a corporation of New York Application August 18, 1942, Serial No. 455,198

5 Claims. (Cl. 98—1.5)

1

The present invention relates to aircraft cabin supercharger arrangements and has for its object to provide an improved construction and arrangement for regulating the supplying of air to a cabin.

For a consideration of what I believe to be novel and my invention, attention is directed to the following specification and the claims appended thereto.

In the drawing, Fig. 1 is a diagrammatic view of an arrangement embodying my invention; Fig. 2 is a top plan view of an air flow valve, and Fig. 3 is a diagrammatic view of a second arrangement embodying my invention.

Referring to the drawing, 1 indicates the cabin of an aircraft to which air is supplied by a centrifugal compressor 2 having an inlet conduit 3 and a discharge conduit 4. Inlet conduit 3 may take air from any suitable source, for example, a ram facing in the direction of the slip stream of the aircraft. Discharge conduit 4 is connected to cabin 1 to supply air to the cabin for supercharging it, a suitable air cooler 5 and check valve 5a being arranged in the conduit, if desired. Centrifugal compressor 2 may be driven by any suitable means. In the present instance, it is shown as being driven by an electric motor 6 connected in an electric circuit 7 in which is arranged an adjustable rheostat 8 for regulating the speed of the motor. The movable rheostat arm 9 of rheostat 8 is connected by a rod 10 to the movable member 11 of a movable abutment here shown in the form of a piston mounted between corrugated bellows 12 and 13 fixed at their outer ends to a support 14. The interiors of bellows 12 and 13 are connected by conduits 15 and 16 to a device in conduit 4 which is responsive to and is a measure of the rate of flow of air through the conduit. In the present instance, a known type of venturi tube 17 is indicated, the high or leading pressure side of the venturi tube being connected to bellows 12 and the low or trailing pressure side of the venturi tube being connected to bellows 13. With this arrangement, it will be seen that when the flow of air through conduit 4 increases, abutment 11 is moved upwardly to effect a movement of rheostat arm 9 in a direction to increase the resistance in circuit 7, thereby decreasing the speed of the motor 6 to reduce the flow while, when the flow through conduit 4 decreases, movable abutment 11 is moved downwardly to decrease the resistance in motor circuit 7 to effect an increase in the motor speed. The foregoing arrangement provides a control which functions to regulate the speed of

2 compressor 2 to cause it to deliver to the cabin a desired constant flow of air. The control arrangement illustrated is only by way of example and is intended to represent any suitable means for regulating the speed of a centrifugal compressor to effect the desired flow. In circuit 7 is a suitable switch 18 for controlling the starting and stopping of the motor.

For regulating the pressure in the cabin, I provide a discharge valve which controls the flow of air from the cabin, the flow being regulated to maintain the desired pressure in the cabin. In the present instance, the valve comprises two spaced flat walls 19 and 20 carried by a base 21 provided with a rectangular opening 22 which communicates with an opening 23 in a wall of the cabin. Pivotally mounted at their lower ends between walls 19 and 20 are two curved plates 24 and 25. The pivot points are indicated at 26. Plates 24 and 25 are provided with longitudinally extending webs 27 and 28 to which are pivoted links 29 and 30 which in turn are connected to a yoke 31. Yoke 31 is connected by a stem 32 to a piston 33 located in a cylinder 34. Piston 33 and cylinder 34 provide a fluid actuated motor or servo-motor, admission of fluid to which is controlled by a pilot valve 35. The pilot valve is connected to cylinder 34 on opposite sides of piston 33 by conduits 36 and 37, the flow of fluid through which is controlled by pilot valve heads 38 and 39. Any suitable source of fluid pressure may be utilized for operating the servo-motor. In the present instance, I have shown it as utilizing the pressure in the cabin. To this end, the space between the pilot valve heads is connected to cabin pressure through an orifice 40 and the spaces on the other sides of the pilot valve heads are connected to the interior of a sealed casing 41 which in turn is connected to atmosphere by a conduit 42. Pilot valve heads 38 and 39 are carried by a pilot valve stem 43 which projects down into casing 41 and is guided at its lower end in a guide opening 44. When the pilot valve moves upwardly, fluid pressure is admitted to a cylinder 34 above piston 33, the space below piston 33 being connected to the interior of casing 41. This admits pressure to the upper side of piston 33, effecting a downward movement of it to lower yoke 31 and move valve plates 24 and 25 toward each other to decrease the rate of flow of air from the cabin. When the pilot valve moves downwardly, the opposite action takes place, piston 33 being moved upwardly to effect a separation of plates 24 and 25, thus permitting an increase in the flow of air from the cabin.

Connected to piston 33 is a rod 33a which projects out through the top wall of the casing with a sliding fit and has a head at its upper end which will facilitate manual operation of valve plates 24 and 25, if desired.

In the operation of an aircraft cabin supercharger mechanism, it is desirable to maintain in the cabin a substantially constant pressure and at the same time maintain a uniform flow of air through the cabin for ventilating purposes. However, in the case of aircraft intended to operate at high altitudes, an altitude is reached at which constant pressure in the cabin can be no longer maintained because of the limitations of the centrifugal compressor. A centrifugal compressor to be used as a supercharger for an aircraft is designed for a certain maximum altitude termed usually the critical altitude of the supercharger. This is the highest altitude at which the compressor is capable of delivering the desired volume of air at the desired pressure. Beyond this altitude, the compressor is limited by the maximum practical speed above which the compressor should not be operated for reasons of safety. This limit on speed of the compressor also establishes a limit to the pressure ratio available from the compressor. The pressure ratio, $P_2/P_1$, is the quotient of the compressor discharge pressure $P_2$ divided by the compressor inlet pressure $P_1$. For stable operation of the compressor, the pressure ratio must not exceed the value for which the compressor was designed. Above this critical altitude, $P_2$ must decrease in value as $P_1$ decreases; in other words, the pressure ratio of the compressor must not be permitted to exceed a predetermined value.

According to my invention, I control the outlet valve to maintain the pressure $P_2$ in the cabin constant until compressor critical altitude is reached after which the compressor is controlled to maintain constant the pressure ratio across the compressor.

Another factor in the supercharging of an aircraft cabin is that the difference in pressure between the inside and outside of the cabin must be maintained within a value which the skin or wall of the cabin is capable of withstanding. This protection may be afforded by a separate valve responsive to pressure differential; for example, a spring-loaded poppet type valve.

The regulating mechanism for the discharge valve is located in casing 41. It comprises a mechanism A which is responsive to the absolute pressure in the cabin and a second mechanism B which is responsive to the pressure ratio across the centrifugal compressor. The mechanism A controls the discharge valve until the compressor critical altitude is reached after which the mechanism B assumes control of the discharge valve.

Mechanism A comprises a bellows 45 attached to the top wall of casing 41 and having its interior subjected to cabin pressure through a port 46. The lower or movable end of bellows 45 is pivotally connected to a lever 47 which in turn is pivoted on a side wall of casing 41, as indicated at 48, and having a fork at its free end which straddles stem 43 at a position between a collar 49 fixed on stem 43 and a collar 50 which may slide on stem 43 and which is pressed against the end of lever 47 by a spring 51 located between collar 50 and a fixed collar 52 on stem 43. Opposing bellows 45 is a second bellows 53 having one end fixed on a support 54 and the other end pivotally attached to lever 47. Bellows 53 is evacuated. Inside bellows 45 is a spring 55 which at its lower end is connected to the movable head of bellows 45 and at its upper end is connected to a rod 56 which extends out through the fixed head of bellows 45 and carries a nut by means of which the tension of spring 55 may be adjusted.

Mechanism B comprises two bellows 57 and 58 fixed at one end to a head of casing 41 and having their interiors connected to the discharge and inlet sides of compressor 2 by conduits 59 and 60. Opposing bellows 57 and 58 with their free ends connected thereto are evacuated bellows 61 and 62 fixed at one end to support 54. Thus, bellows 57 and 58 respond to the absolute pressures on the discharge and inlet sides of compressor 2. Pivotally connected to movable ends of bellows 57 and 58 is a lever 63 having a fork at its free end which straddles stem 43 and is adapted to engage a collar 64 fixed on stem 43.

Normally, the outlet valve is under the control of mechanism A. As the pressure in the cabin increases and decreases, bellows 45 moves lever 47 to effect movement of pilot valve 35 to adjust the outlet valve in the manner already described, it functioning to maintain the cabin pressure constant. During this time, pilot valve stem 43 moves independently of lever 63. When the pressure ratio across the compressor 2 reaches a predetermined high value, i. e., passes beyond the critical value, lever 63 is moved by bellows 57 and 58 to bring its head into engagement with collar 64, thereby taking the control away from bellows 45 and moving the pilot valve to maintain constant the pressure ratio across the compressor. If the pressure ratio exceeds the desired value, pilot valve stem 43 is moved downward by lever 63, admitting fluid pressure to cylinder 34 beneath piston 33 to raise the piston to open the discharge valve to permit air to flow more rapidly from the cabin and thus reduce the pressure therein. Spring 51 is of a strength such that it holds sliding head 50 fixed for movement of stem 43 by lever 47 but may be overcome by lever 63 which moves stem 43 against the action of spring 51.

The pressure maintained in the cabin can be adjusted by adjusting the tension of spring 55.

Yoke 31 and links 29 and 30 form a differential operating means for valve plates 24 and 25 whereby as piston 33 moves downwardly the plates for each unit of movement of piston 33 approach each other at a gradually decreasing rate. This serves to reduce the sensitivity of the device as the valve plates approach each other over what it would be if the plates approached each other at a uniform linear rate per unit movement of piston 33. As a result, more accurate and reliable regulation is obtained.

In Fig. 3 is shown a modification of my invention wherein a regulating mechanism controls the discharge valve through the intermediary of an electric motor and wherein means are provided whereby the pilot can regulate the cabin pressure and the rate of change of cabin pressure at will. In this modification, the valve plates 70 and 71 corresponding to the valve plates 24 and 25 of Fig. 1 are provided with links 72 and 73 connected to gears 74 and 75 which in turn are connected through pinions 76 and 77 with the shaft 78 of a reversing motor 79. Links 72 and 73 are eccentrically connected to the webs of gears 74 and 75 so that as the gears turn, plates 70 and 71 are moved toward and away from each other.

The pressure responsive mechanisms shown in Fig. 3 are similar to those shown in Fig. 1 and the same reference characters have been applied to corresponding parts. Lever 47 of absolute pressure responsive mechanism A has its free end located between spaced contacts 81 and 82 connected by conductors 83 and 84 to contacts 85 and 86 of a polarized relay 87. Polarized relay 87 has two windings 88 and 89 which on one side are connected to contacts 90 and 91 located on opposite sides of the free end of lever 63 and on the other side by a conductor 92 to a source of electrical energy 93. At 94 is a main switch by means of which source 93 may be connected to and disconnected from the circuits. Relay 87 is provided with a back contact 95 connected by a conductor 96 to a second contact 97 carried by and insulated from lever 63. Contact 97 is adapted to engage a fixed contact 98 connected by a conductor 99 to source 93. Lever arm 63 is grounded as is indicated at 100.

Spring 55 has its free end connected by a rod 101 to a slotted yoke 102. Yoke 102 is adapted to be adjusted by means of a reversing motor 103 provided on its shaft with an eccentric pin 104 located in the slot of yoke 102. Motor 103, which is preferably of a type having a built-in reduction gearing (termed usually a gear motor), is connected in circuit with source of energy 93, the circuit including a reversing switch 105 located in a position to be operated by the pilot. By means of switch 105, the pilot can effect operation of motor 103 in either direction, the motor thus forming a power means for adjusting the setting of spring 55, thus adjusting the regulator for the desired cabin pressure. On the instrument board in the aircraft is an indicator to show the pilot the pressure for which the regulator is adjusted. In the present instance, this is shown diagrammatically as being in the form of a direct current telemetering system of known type; for example, the type shown in the patent to Faus 2,248,616, July 8, 1941. It comprises a receiver 106 connected in circuit with a transmitter 107, the movable member of which is connected by an arm 108 and a link 109 to yoke 102. Thus, as yoke 102 is raised and lowered, the movable member of transmitter 107 is moved a corresponding amount and its position is indicated on the receiver 106. Thus, the pilot by looking at the receiver 106 can see for what pressure the control mechanism is set.

With switch 94 closed and lever 63 of pressure responsive mechanism B in engagement with contact 90, winding 88 of the polarized relay is energized and the armature of the polarized relay stands in the position shown in Fig. 3. In this position of the armature, motor 79 is connected directly through polarized relay contacts 85 and 86 to contacts 81 and 82 whereby the absolute pressure responsive mechanism A controls motor 79 to effect adjustment of the outlet valve to maintain in the cabin the constant pressure for which spring 55 is set. If the pressure increases, lever arm 47 engages contact 82 to operate motor 79 in a direction to open the outlet valve to bring the pressure back to the desired value and if the pressure decreases, lever 47 engages contact 81 to operate the motor 79 in a direction to close the outlet valve, thus increasing the pressure in the cabin. When the pressure ratio across the compressor reaches a predetermined high value, (i. e., when critical altitude is reached), pressure ratio responsive mechanism B takes control and operates to move contact lever 63 out of engagement with contact 90 and into engagement with contact 91, thus closing a circuit on winding 89 of relay 87 to reverse the position of the armature, moving it out of engagement with contacts 85 and 86 and bringing it into engagement with back contact 95. At the same time, contact 97 is brought into engagement with contact 98. This closes a circuit from source 93, through contacts 98, 97 and contact 95 to motor 79 operating it in a direction to open the outlet valve to reduce the pressure in the cabin. This decreases the pressure ratio across the compressor whereupon arm 63 moves away from contacts 91 and 98. The outlet valve is now controlled by lever 63 and contacts 97 and 98 until such time as the pressure ratio is reduced to a value such that lever 63 moves back into engagement with contact 90 whereupon a circuit is closed on winding 88 of the polarized relay, reversing its position and putting absolute pressure responsive mechanism A into control. Contacts 90 and 91 and the polarized relay serve to transfer the control for motor 79 back and forth between the pair of contacts 81 and 82 and the contact 98. The contacts 90 and 91 may be spaced to require such a change in the value of the differential to effect movement of the polarized relay as will give stability of operation.

In connection with cabin supercharging, it is desirable to be able not only to adjust the regulator for different cabin pressures but also to control the rate of change of pressure in the cabin. To this end, there is provided in connection with control switch 105 suitable resistances 110 and 111 in the circuits for motor 103. Motor 103 may be a gear motor, i. e., a motor having a built-in reduction gearing whereby very slow movement of its shaft and adjustment of spring 55 may be obtained. This rate of change of adjustment may be varied by varying the motor speed by means of resistances 110 and 111. For example, if the aircraft is at an altitude of 20,000 feet with the regulator set to maintain a cabin pressure corresponding to an altitude of 10,000 feet and it is desired to land at an airfield having an altitude of 5,000 feet, the operator when he is ready to descend may set switch 105 to operate motor 103 in a direction to adjust the regulator to increase the cabin pressure and by means of including more or less of the resistance in the motor circuit can effect a desired rate of change. The rate of change may be made such that the change in cabin pressure will be made with maximum comfort for the occupants of the cabin. Also, after taking off, the operator may set switch 105 to give the desired rate of change in cabin pressure independently of the rate at which the aircraft climbs. For example, it may be desirable to vary the rate of change according to the length of flight, a more gradual change being desirable on a longer flight than on a shorter flight.

As will be clear, the arrangement shown in Fig. 3 for adjusting spring 55 may be used in connection with the apparatus of Fig. 1, or vice versa.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. In combination, an aircraft cabin, a centrifugal compressor having its discharge side connected to the cabin, means for driving the compressor, means responsive to the amount of air delivered by the compressor for regulating said driving means, means controlling flow of air from the cabin, and means responsive to cabin pressure and to the pressure ratio across the compressor for regulating said air flow controlling means.

2. In combination, an aircraft cabin, a centrifugal compressor having its discharge side connected to the cabin, means for driving the compressor, means responsive to the amount of air delivered by the compressor for regulating said driving means, means controlling flow of air from the cabin, means responsive to cabin pressure for normally regulating said air flow controlling means, and means responsive to the pressure ratio across the compressor for regulating said air flow controlling means when such pressure ratio reaches a predetermined high value.

3. In combination, an aircraft cabin, a centrifugal compressor having its discharge side connected to the cabin, means for driving the compressor, means responsive to the amount of air delivered by the compressor for regulating said driving means, means controlling flow of air from the cabin, a sealed compartment in the cabin, means connecting the interior of the compartment to atmosphere, a device in the compartment responsive to absolute cabin pressure, means connecting it to said air flow controlling means for maintaining normally constant absolute pressure in the cabin, a device in said compartment responsive to the pressure ratio across the compressor, and means whereby said last-named device takes control of said air flow controlling means to the exclusion of said first-named device when such pressure ratio reaches a predetermined high value.

4. In combination, an aircraft cabin, a centrifugal compressor having its discharge side connected to the cabin, means for driving the compressor, means responsive to the amount of air delivered by the compressor for regulating said driving means, a valve controlling flow of air from the cabin, means including a differential linkage for adjusting the valve, and means responsive to absolute cabin pressure and to the pressure ratio across the compressor for actuating said valve adjusting means.

5. In combination, an aircraft cabin, means for supplying air under pressure to the cabin to supercharge it, means for regulating said air supplying means to effect delivery of a desired amount of air to the cabin, means controlling flow of air from the cabin, a sealed compartment in the cabin, means connecting the interior of the compartment to atmosphere, a device in said compartment responsive to absolute cabin pressure, means connecting it to said air flow controlling means for maintaining normally constant absolute pressure in the cabin, a device in said compartment responsive to the pressure ratio across the compressor, and means whereby said last-named device takes control of said air flow controlling means to the exclusion of said first-named device when such pressure ratio reaches a predetermined high value.

CHARLES W. MORRIS.

REFERENCES CITED

The following references are of record in the file of this patent:

UNITED STATES PATENTS

| Number | Name | Date |
|---|---|---|
| 2,284,984 | Nixon et al. | June 2, 1942 |
| 2,276,371 | Cooper et al. | Mar. 17, 1942 |
| 1,562,663 | Strong | Nov. 24, 1925 |
| 2,265,461 | Wagner | Dec. 9, 1941 |
| 2,208,554 | Price | July 16, 1940 |
| 2,002,057 | Gregg | May 21, 1935 |
| 2,307,199 | Cooper | Jan. 5, 1943 |

FOREIGN PATENTS

| Number | Country | Date |
|---|---|---|
| 679,386 | France | Jan. 9, 1930 |
| 521,623 | Great Britain | May 27, 1940 |